United States Patent [19]

Guerder et al.

[11] 4,367,013

[45] Jan. 4, 1983

[54] PREPARATION OF SEMIFINISHED PRODUCT FOR MANUFACTURE OF OPTICAL FIBERS

[75] Inventors: Pierre Guerder, Pithiviers; Andre Ranson, Rueil-Malmaison, both of France

[73] Assignee: Quartz & Silice, Paris, France

[21] Appl. No.: 233,512

[22] Filed: Feb. 11, 1981

[30] Foreign Application Priority Data

Feb. 15, 1980 [FR] France ................ 80 03369

[51] Int. Cl.³ .................. C03B 19/00; C03B 37/075; G02B 5/14
[52] U.S. Cl. ................... 350/96.34; 65/3.12; 65/18.2; 501/37; 501/38; 501/54; 501/57
[58] Field of Search .......... 65/3.12, 3.2, 18.2; 350/96.30, 96.33, 96.34; 501/37, 38, 54, 57; 427/34, 163

[56] References Cited

U.S. PATENT DOCUMENTS

| | | | |
|---|---|---|---|
| 3,782,914 | 1/1974 | De Luca et al. | 65/3.12 |
| 3,869,194 | 3/1975 | Shiraishi et al. | 350/96.34 |
| 4,002,512 | 1/1977 | Lim | 65/3.12 X |
| 4,045,198 | 8/1977 | Rau et al. | 350/96.30 |
| 4,135,901 | 1/1979 | Fujiwara et al. | 65/3.12 X |
| 4,161,505 | 7/1979 | Shiraishi et al. | 65/3.12 X |
| 4,162,908 | 7/1979 | Rau et al. | 65/3.2 X |
| 4,165,915 | 8/1979 | Rau et al. | 65/3.12 X |
| 4,221,825 | 9/1980 | Guerder et al. | 65/3.12 X |

FOREIGN PATENT DOCUMENTS

| | | |
|---|---|---|
| 1029993 | 4/1978 | Canada . |
| 2247307 | 3/1974 | Fed. Rep. of Germany ....... 65/3.12 |
| 1061042 | 3/1967 | United Kingdom . |
| 1213603 | 11/1970 | United Kingdom . |
| 1391177 | 4/1975 | United Kingdom . |
| 1431352 | 4/1976 | United Kingdom . |
| 1492920 | 11/1977 | United Kingdom . |

OTHER PUBLICATIONS

Kaiser et al., "Spectral Losses of Unclad Vitreous Silica ...", J. Opt. Soc. Amer., vol. 63, No. 9, Sep. 1973, pp. 1141-1148.

Primary Examiner—Richard V. Fisher
Attorney, Agent, or Firm—Pennie & Edmonds

[57] ABSTRACT

A process is described for making a doped-silica ingot useful in the manufacture of optical fibers. At least a silicon compound and a titanium compound are decomposed in the flame of the induction plasma burner in the presence of a determined supply of hydrogen and are reacted with the oxygen contained in the burner feed gas and/or in the vector gas to form $SiO_2$ and $H_2O$ against a heat-stable support. As a result silica and titanium oxide are deposited on the support in the form of a homogeneous vitreous mass exhibiting a selected concentration of hydroxyl groups between 10 and 50 parts per million. Fluorine-doped silica is deposited radially in the same way on the resulting ingot. The resulting semifinished product is a cylinder consisting of a titanium-doped silica core, whose $TiO_2$ concentration by weight is about 0.1 to 8%, covered by a sheath of fluorine-doped silica, whose fluorine concentration is about 0.1 to 3%.

19 Claims, 2 Drawing Figures

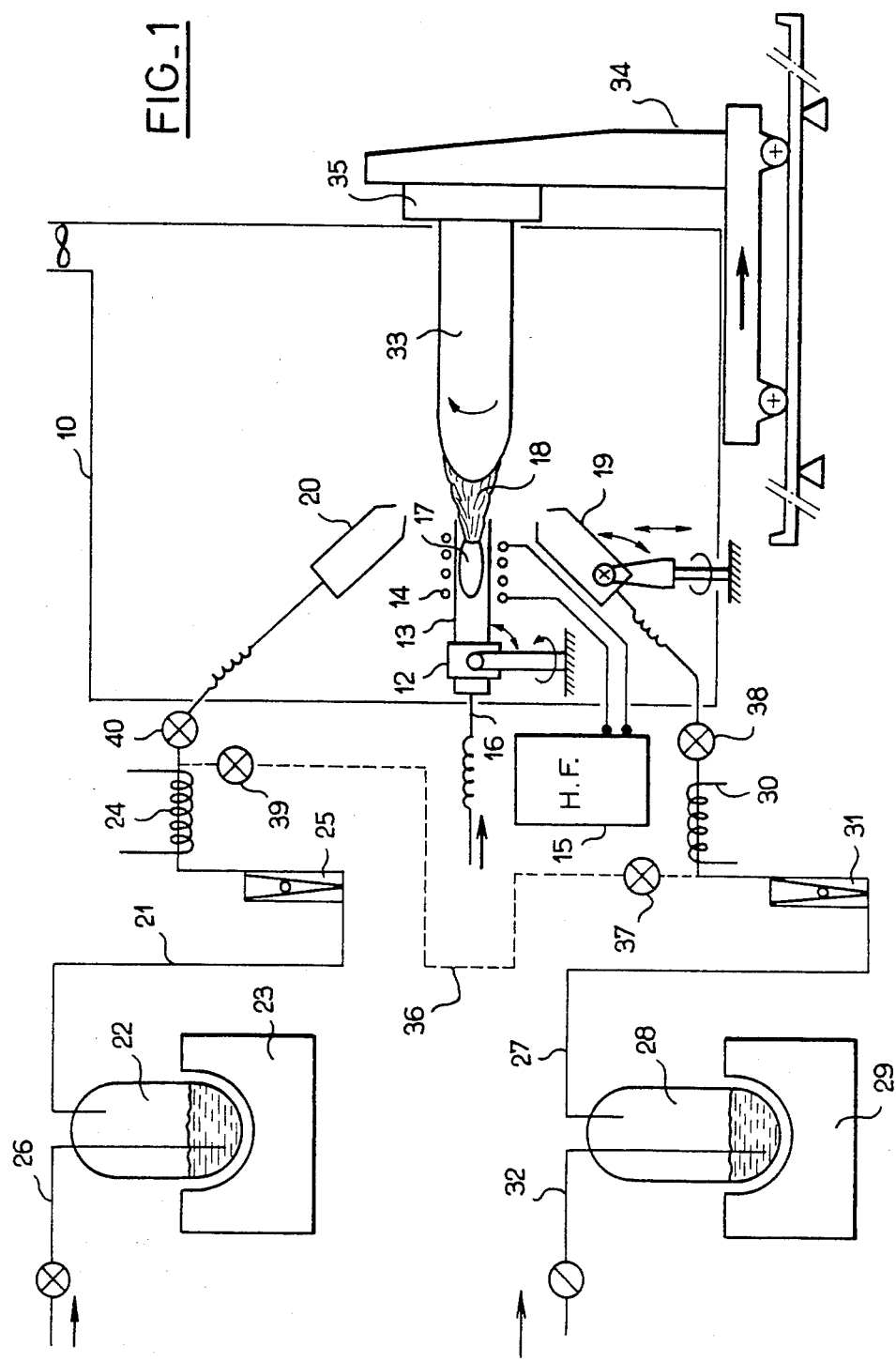
FIG_1

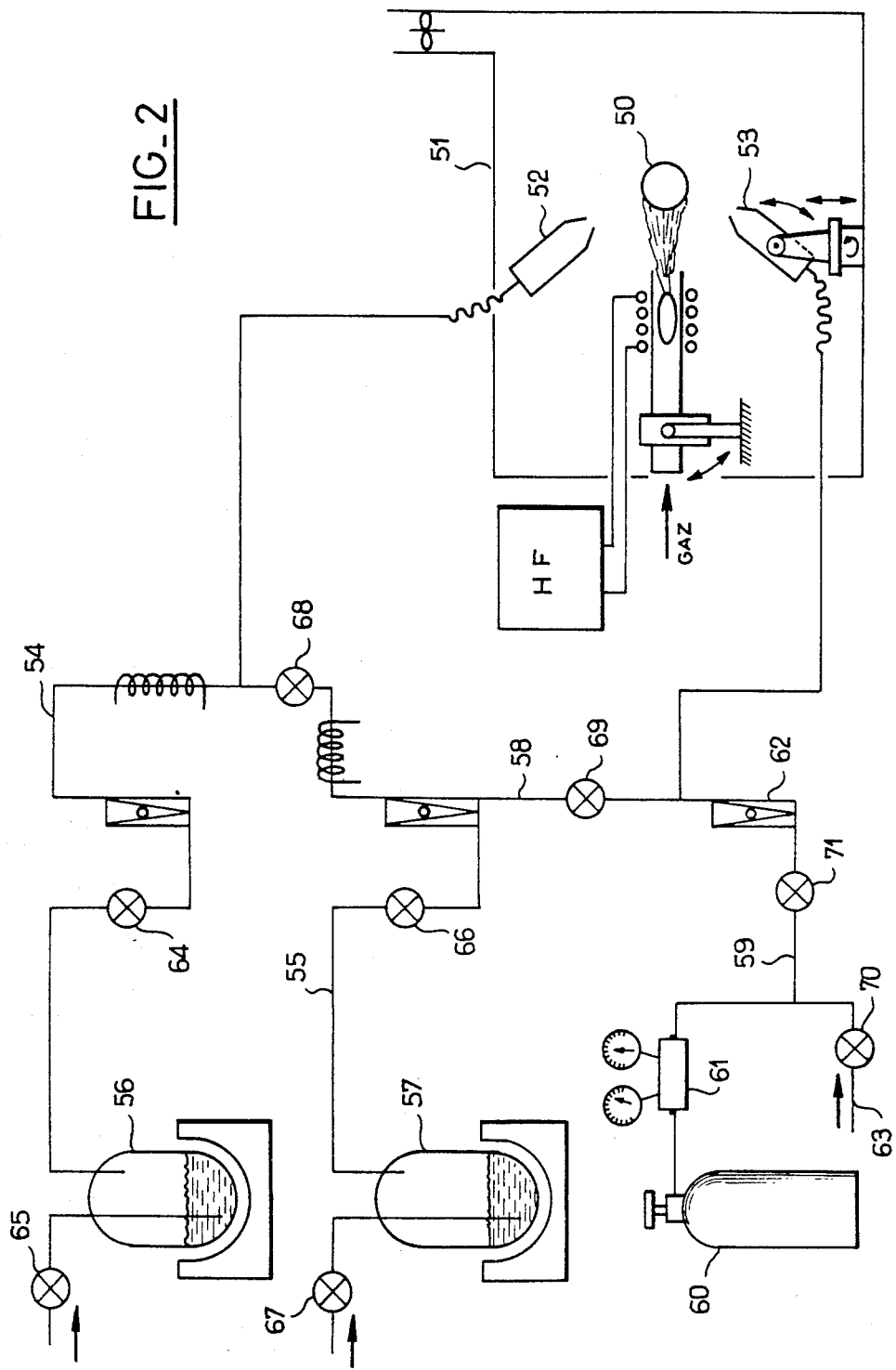
FIG_2

PREPARATION OF SEMIFINISHED PRODUCT FOR MANUFACTURE OF OPTICAL FIBERS

TECHNICAL FIELD

This invention relates to a semifinished product for the production of optical fibers with a large numerical aperture and slight attenuation intended primarily for the transmission of light signals, to a process for making this semifinished product, and to an optical fiber produced from it.

BACKGROUND OF THE INVENTION

Glass fibers used for the transmission of light signals have a cylindrical structure in which the index of refraction of the center of said structure (for example, a homogenous core) is greater than the index of refraction of the periphery (for example, a sheath). The numerical aperture of such a fiber increases with increasing divergence between the indices of refraction of the center and periphery.

The difference between the coefficients of expansion of the glasses constituting the core and sheath should be slight enough to avoid the formation of stresses which can cause fractures during the fabrication of the semifinished product and during its drawing into the shape of rods and, ultimately, into fibers.

It is known in this field that optical fibers should have the lowest possible losses from absorption and diffusion and the best glasses are pure silica and various doped silicas. It is also known that the index of refraction of the silica can be modified by addition of doping elements with titanium, aluminum, or germanium oxides increasing the index of refraction and boron and fluorine decreasing it.

Of the various possible combinations, the one that best meets these requirements is $SiO_2.TiO_2/SiO_2.F$.

To produce an $SiO_2.TiO_2/SiO_2.F$ composite structure having a very good transparency and a large numerical aperture by drawing, however, it is necessary to solve two major difficulties. First, it is known that the $Ti^{3+}$ ion considerably increases the light losses by absorption as indicated particularly by French Pat. No. 2,002,589. Hence, it is necessary to prevent even the very slightest part of the titanium from going from the $Ti^{4+}$ oxidation state to the $Ti^{3+}$ state during formation of the titanium-doped silica, during its heating when a second glass is deposited, and during its drawing. Second, a sufficient amount of fluorine must be incorporated in the silica to reduce the index of refraction of said silica significantly.

It has long been known how to prepare a titanium-doped silica by thermal decomposition of Si and Ti gaseous compounds, such as $SiCl_4$ and $TiCl_4$ in the presence of oxygen. However, the standard process using an oxyhydrogen blower gives a silica containing an average of 1000 parts per million (ppm) of hydroxyl groups. This high OH ion concentration produces intense absorption bands in the near infrared spectral zone that are widely used in industrial optical application. Such concentrations, however, are not suitable for use in telecommunication optical fibers. The influence of hydroxyl groups on attenuation in pure silica or simple silica-base glasses is described, for example, in Kaiser et al., *Journal of the Optical Society of America*, Vol. 63, No. 9, p. 1141 (1973). According to this article, for an OH ion content of 50 ppm, the attenuations measured at wavelengths of 720, 820, 880 and 945 nanometers are 3.5; 0.2; 4.5 and 50 dB/km, respectively.

To remedy this drawback, an effort has been made to exclude any trace of water in the silica. Such a process is described in French Pat. No. 1,380,371. It constitutes introducing a hydrogen-free, oxidizable silicon compound in a flame that is also hydrogen-free.

This type of process was then used to obtain a titanium-doped silica. As disclosed in French Pat. No. 2,150,327, at least a hydrogen-free, oxidizable silicon compound and a hydrogen-free, oxidizable titanium compound may be introduced into a gaseous current, also hydrogen-free, containing oxygen, brought to a high temperature. Under these conditions, titanium-doped silica, free of OH ions is obtained. Nevertheless, such silica has a very slight transparency because of a violet coloring arising from the incorporation in the silica of titanium partly in $Ti^{3+}$ form.

It is also known to make fluorine-doped silica and cover a siliceous material with it. Thus, French Pat. No. 2,208,127 describes the deposit of a fluorine-doped silica glass on a rod or tube of pure molten silica. A rod driven in a double translation and rotation movement is subjected to an atmosphere of gaseous silicon fluoride $SiF_4$. By oxidation in a plasma, silica is formed in which fluorine is incorporated. However, the process makes it possible to introduce only slight amounts of fluorine in the silica layer that is formed, and the divergence between the indices of refraction is insufficient to obtain the desired optical characteristics in the glass fiber.

To remedy this drawback, French Pat. No. 2,321,459 describes a process of preparing vitreous silica, doped with fluorine and free of OH ions, by reaction of a silicon compound, such as $SiCl_4$, and a fluorine compound, with the oxygen contained in a hydrogen-free gaseous current in the flame of an induction plasma burner. The compound used to dope the silica is a fluorocarbon compound, namely, dichlorodifluoromethane, $CCl_2F_2$, added in vapor form to the oxygen introduced in the plasma burner. This compound decomposes in the very hot flame of the plasma at the same time that $SiO_2$ is formed. The vitreous silica, thus doped with fluorine, is deposited radially on the surface of a cylindrical blank of pure silica or one doped with metal oxides.

This process indeed makes it possible to obtain a sufficient amount of fluorine in the silica formed on the surface of the blank but it has a major drawback. It does not teach how to obtain in the center of the blank a titanium-doped silica free of $Ti^{3+}$ ions. Further, the presence of carbon in the molecules of the fluorine compound increases the risk of reduction of the titanium which would increase still more the proportion of $Ti^{3+}$. This process therefore does not seem suited to obtain optical fibers of suitable quality.

French Pat. No. 2,321,710 describes another method for obtaining an optical fiber consisting of a titanium-doped silica core and a fluorine-doped silica sheath. It consists in starting with a fluorine-doped silica cylinder in which a titanium-doped silica rod is introduced and in thoroughly fusing these two pieces by drawing them in a tubular furnace.

Besides the drawbacks already mentioned, this process requires a series of machining, polishing and cleaning operations that make it long and costly. Further, there is the danger that defects, which are a considerable cause of diffusion losses, will appear at the core-sheath interface.

SUMMARY OF THE INVENTION

This invention has for its object another process for making a cylindrical semifinished product having at least in its central part or core a titanium-doped silica with a very good transparency that can be covered directly, without alteration of its properties, by a glass layer whose index of refraction is less than that of said doped silica.

The invention further has for its object a process of making a cylindrical semifinished product formed by a titanium-doped silica central part and a fluorine-doped outer part not having known technical drawbacks.

Another object of the invention is a high-yield process of making a semifinished product of great purity whose titanium, fluorine and hydroxyl groups content can be controlled.

The object of the invention is also a semifinished product made of titanium- and fluorine-doped silicas whose contents can vary in a wide range.

To achieve certain of these aims, we decompose at least a silicon compound and a titanium compound in the flame of an induction plasma burner in the presence of a determined supply of hydrogen, making them react with the oxygen contained in the burner feed gas and-/or in the vector gas to form $SiO_2$ and $H_2O$ against a heat-stable support so as to deposit the silica and titanium oxide thereon in the form of a homogenous vitreous mass having a hydroxyl groups concentration between 10 and 50 parts per million.

According to another characteristic of the invention, the hydrogen is supplied in combined form by at least one of the silicon and titanium compounds.

In this case, the total hydrogen content of the initial compound or compounds sent into the flame is such that the amount of hydroxyl groups incorporated in the doped silica is between 10 and 50 parts per million and preferably between 20 and 30 parts per million.

Advantageously, the silicon and titanium compounds are injected on the outside of the burner and go into the plasma flame crosswise. The high temperature of the flame leads to a thermal dissociation of the compounds that are injected therein and to the creation of a mixture of $SiO_2$, $TiO_2$ and $H_2O$ in the part of the burner flame close to the support.

A very great advantage of the process according to the invention is the obtaining of a vitreous mass that stays perfectly transparent and colorless both at the time of forming the semifinished product and during its drawing into the form of rods and, ultimately, into fibers. The absence of any violet coloring, which is proof of the absence of titanium at degrees of oxidation other than $Ti^{4+}$ is assuredly linked to the presence in the vitreous lattice, of hydroxyl groups formed by oxidation of the hydrogen contained in at least one of the compounds sent into the burner flame.

While only hypotheses can be advanced as to the phenomenon involved, it has been found that the variation of transparency is directly linked to the variation of the hydrogen content in the materials used, the plasma feed gas and the vector gases being free of hydrogen.

The total hydrogen content of the mixture of compounds sent into the plasma flame should be between 100 and 500 parts per million. Below 100 ppm of hydrogen, the titanium oxide can begin to appear in the form of $Ti_2O_3$; and above 500 ppm of hydrogen, on the other hand, the OH ion concentration is such that the characteristic absorption bands, at wavelengths of 720, 820, 880 and 945 nanometers, are too intense and too wide to permit optical applications in the near infrared.

Another important advantage presented by the resulting doped silica is that the titanium oxide remains in the $Ti^{4+}$ form, even when the silica is later covered by another doped silica such as fluorine-doped silica.

BRIEF DESCRIPTION OF THE DRAWING

These and other objects, features, elements and advantages of the invention will be more readily apparent from the following detailed description of the invention in which:

FIG. 1 is a diagrammatic view of a device used for preparing titanium-doped silica, and FIG. 2 is a diagrammatic view of a device used to obtain a radial deposit on the titanium-doped silica.

DETAILED DESCRIPTION OF THE INVENTION

In the diagrammatic device in FIG. 1, a practically closed enclosure 10 protects a plasma burner from the ambient atmosphere. This burner comprises a silica tube 13 surrounded by an induction coil 14 electrically connected to a generator 15. Advantageously generator 15 is a high-voltage (10 kilovolts), high-frequency (2 megahertz) device. The burner is mounted on an adjustable support 12 which permits its oriention to be varied. The silica tube has one end closed by a nozzle 16 through which are introduced a plasma-forming gas or gases such as air, oxygen, argon, nitrogen protoxide or their mixtures. It is imperative to choose a gas mixture containing oxygen that is free or combined to assure the chemical formation of $SiO_2$ and $TiO_2$.

The plasma burner is started conventionally by first sending a gaseous argon current through nozzle 16 and introducing a grounded metal rod into the field of the induction coil. The argon is then replaced as quickly as possible with the plasma-forming gas chosen. A plasma 17 is then produced in a "flame" 18 which reaches very high temperatures on the order of 10,000° C.

Two nozzles 19 and 20 are placed on the outside of the plasma burner, preferably on each side of silica tube 13, crosswise to and directed toward the flame. The nozzles are advantageously mounted on supports that make it possible to direct them at will, as shown in FIG. 1 for nozzle 19.

Nozzle 20 is connected by a pipe 21 to an evaporator 22 containing silicon tetrachloride in the liquid state, which is heated by a heating device 23. The $SiCl_4$ vapors are entrained by a vector gas which is piped into evaporator 22 by a pipe 26. The entrained vapors are then piped through pipe 21 and nozzle 20 to the plasma flame. This vector gas is preferably oxygen but can also be nitrogen or argon if the plasma-forming gas is rich in oxygen. The vector gas can also consist of a mixture of oxygen or air with an inert gas. A low level of oxygen in the flame can be compensated for by use of a vector gas very rich in oxygen. A heating resistor 24 is placed around pipe 21 to prevent condensation of the silicon tetrachloride vapors that circulate therein. A flowmeter 25, inserted in the circuit, indicates the amount of tetrachloride evaporated per unit of time.

Nozzle 19 is connected by a pipe 27 to an evaporator 28 containing titanium tetrachloride in the liquid state, which is heated by a heating device 29. The $TiCl_4$ vapors are entrained by a vector gas which is piped into evaporator 28 by a pipe 32. The composition of this gas is identical to that of the gas supplied by pipe 26. A heating resistor 30 surrounds pipe 27 to prevent condensation of the $TiCl_4$ vapors on its walls. A flowmeter 31, placed upstream from nozzle 19, indicates the amount of tetrachloride evaporated per unit of time.

The vector gas or gases, like the plasma-forming gases, must be rigorously dry and are dried, if necessary by a drying machine (not shown).

In practicing the invention, the doped silica is deposited axially on a blank 33 of regular grade vitreous silica. This blank is carried by a mobile device 34 that includes apparatus that positions the blank in front of the flame and moves it in translation in relation to the flame in the direction indicated by the arrow on device 34. In addition, during the entire period of the operation, a known type of mechanical mounting comprising a mandrel 35 rotates blank 33 in the direction indicated by the arrow on blank 33. This rotation is necessary to obtain a cylindrical ingot of regular diameter.

It obviously is possible to use more than two nozzles, for example, by arranging them in a crown around the plasma flame, to obtain a good distribution of the outside injection of the products. It is also possible, thanks to a shunt 36 placed downstream from the meters and to a system of valves 37 to 40, to inject the mixture of silicon and titanium compounds directly into the flame by a single nozzle.

To control the hydrogen supply, it is important to use raw materials, in particular plasma-forming gases and vector gases, which are absolutely free of hydrogen except in the case of at least one gas where the hydrogen is present in a predetermined amount. Thus, to obtain OH ions, it is advantageous to work with pure $SiCl_4$ and $TiCl_4$ and to use a known amount of a silicon and/or titanium compound having a chemical formula containing at least one hydrogen atom. By way of non-limiting example, it is practical to add a determined amount of trichlorosilane $SiHCl_3$ to the $SiCl_4$, guaranteed pure, without hydrogenated impurity.

It is also possible to use a titanium hydrogen compound which contains titanium in the form of $Ti^{4+}$. An advantageous example of the titanium compound that can be used is isopropyl titanate $Ti(OC_3H_7)_4$, because this product has a great hydrogen content. Another is isobutyl titanate. It is indeed obvious that the necessary hydrogen can also come simultaneously from silicon and titanium compounds. Injection of the hydrogen compound or compounds into the flame of the plasma burner can be done independently of the silicon and titanium compounds.

After the plasma burner has been started as indicated above, the synthetic silica blank is heated in the plasma flame, with rotation on its mandrel on the inside of the enclosure, until a very high surface temperature, greater than 2,000° C., is reached. The vapors of the silicon compound or compounds entrained by the vector gas are then injected in the flame by a nozzle 20 while those of the titanium compound or compounds arrive by nozzle 19.

In the presence of the oxygenated plasma, the silica compound or compounds are decomposed because of the very high temperature and react with the oxygen to form $SiO_4$ and possibly $H_2$. Simultaneously, the titanium compound or compounds are decomposed and oxidized to form $TiO_2$ and possibly $H_2O$. The oxides thus formed in the state of microscopic particles are deposited on the blanks in a fairly uniform distribution. To obtain deposit of a transparent and homogeneous glass, it is important to have stable and invariable conditions. Consequently, the "growth front" of the ingot must be kept at a constant distance from the plasma flame to maintain a constant temperature. This is achieved by progressively moving mobile device 34 back in the direction of the arrow thereon as the length of the ingot increases. Consequently, the apparatus shown in FIG. 1 also comprises a device (not shown) for detecting the position of the ingot in relation to the flame and for controlling the movement of the mobile support. Such a device comprises, for example, a photoelectric cell and associated circuitry.

The speeds of translation and rotation of the blank are regulated as a function of the diameter of the ingot and the degree of homogeneity or transparency one wants in the final product. They also depend on the rate of delivery of silicon and titanium compounds. The delivery of the titanium compound or compounds is regulated so as to obtain in the silica a weight percentage of $TiO_2$ that can vary between 0.1 and 8%.

The qualities of the titanium-doped silica obtained by the process according to the invention are shown clearly by the two following comparative examples. According to the usual theories, we assume that water goes into silica glass in the form of OH ions.

EXAMPLE I

Evaporator 22 is filed with a mixture of silicon tetrachloride ($SiCl_4$) and trichlorosilane ($SiHCl_3$) at a rate of 34 grams $SiHCl_3$ per kilogram of $SiCl_4$. The vapors of the silicon compounds are entrained by a dry, pure oxygen current delivered by pipe 26 at a rate of 100 liters per hour. Heating of evaporator 22 is regulated to obtain a delivery of 500 grams per hour of silicon compound.

Evaporator 28 is filled with titanium tetrachloride ($TiCl_4$). The $TiCl_4$ vapors are entrained by a dry, pure oxygen current delivered by pipe 32 at a rate of 20 liters per hour. Heating is regulated to obtain a $TiCl_4$ delivery of 50 grams per hour. Nozzle 16 delivers dry, pure oxygen at a rate of 5 normal cubic meters per hour.

Under these conditions, a deposit of vitreous silica containing 3% titanium in the form of $TiO_2$ is made at a rate of 160 grams per hour on a blank with an 80-millimeter diameter that is rotated by mandrel 35 and moved axially by device 34.

At the end of the operation, a perfectly transparent, colorless doped silica cylindrical ingot, 90 millimeters in diameter and weighing 40 kilograms, is obtained. Its average OH content is 22 parts per million. This silica exhibits an index of refraction $n_d = 1.470$.

The attenuation in the mass is found to be lower than 4 dB/km by microcalorimetric measurements of the glass as a whole with a continuous laser emitting at a wavelength of 1060 nm. The value found corresponds to the sensitivity limit of the equipment.

EXAMPLE II

With the same operating conditions of the preceding example being used, a titanium-doped silica ingot is formed from pure $SiCl_4$, excluding any presence of hydrogen.

The OH content, measured by the absorption band at 2730 nm, is less than 3 parts per million. The material deposited has an index of refraction $n_d = 1.469$ and exhibits a violet coloring in the entire mass. The attenuation, measured on the glass as a whole by microcalorimetry, is on the order of 10,000 dB/km.

Fabrication of a semifinished product meeting the aims envisaged by the invention can be performed by radially depositing other doped silicas on the titanium-doped silica. To do this, the operation is as follows.

Two tails of regular quality silica are welded to the ends of the titanium-doped silica ingot made with the apparatus of FIG. 1. The ingot is then mounted, in a known manner, on any standard glass stand able to move horizontally. This mounting permits the rotation of the ingot on itself and its alternative movement at a constant speed in front of the plasma flame.

As shown in FIG. 2, ingot 50, represented in cross section, is arranged so that its axis is approximately perpendicular to that of the plasma blowpipe described above. For clarity in the drawing, the glass stand and its movement device, which are well known, are not shown. The unit is enclosed in a practically closed enclosure 51. Two nozzles 52 and 53 are also placed in this enclosure and offer the same regulation possibilities as nozzles 19 and 20 described above.

Nozzle 52 is connected by pipes 54 and 55, respectively, to an evaporator 56 containing a silicon compound or compounds and to an evaporator 57 containing a titanium compound or compounds. This part of the apparatus is identical with that shown in FIG. 1.

Nozzle 53 is connected by pipes 55 and 58 to evaporator 57 and by pipe 59 to a tank 60 containing a fluorine product under pressure. Pipe 59 is provided with a pressure regulator 61 and a flowmeter 62. Further, a vector gas, such as dry oxygen, can be introduced into pipe 59 by a pipe 63 connected upstream from flowmeter 62.

After the plasma blowpipe has been heated by the known technique and ingot 50 heated in rotation, valves 64 to 68 are opened while valves 69 to 71 are kept closed. Evaporators 56 and 57 contain mixtures identical with those described in example 1. Pure dry oxygen at a rate between 20 and 100 liters per hour is sent through valves 65 and 67. Heating of evaporators 56 and 57 is regulated to obtain the delivery of between 0.5 and 3 kilograms per hour of the silicon compound and between 50 and 200 grams per hour of the titanium compound. The entrained vapors are injected in the plasma flame by nozzle 52. Thus, titanium-doped silica is deposited radially on ingot 50, the $TiO_2$ concentration being constant or variable depending on whether the delivery of the titanium compound is kept constant or progressively reduced during the operation.

When ingot 50 reaches the desired diameter, valves 66 and 68 are closed and valves 71 and 70 are opened. Fluorine gas and pure, dry oxygen are sent through valves 71 and 70 at a rate of 20 to 100 liters per hour; and the mixture of oxygen and fluorine gas is injected in the plasma flame by nozzle 53.

If a fast rate of deposit is desired, the fluorine gas will preferably be an inorganic compound such as sulfur hexafluoride $SF_6$, nitrogen trifluoride $NF_3$ or their mixture. However, other fluorine compounds can also be used such as dichlorodifluoromethane $CCl_2F_2$ because, in accordance with the invention, there is no longer any risk that the titanium in the titanium-doped silica would be reduced to $Ti^{3+}$.

The silicon and fluorine compounds, injected in the plasma flame, are transformed into silica and fluorine and deposited radially on ingot 50 in the form of a transparent, bubble-free layer of fluorine-doped silica glass. The resulting silica can contain a weight percentage of fluorine between 0.1 and 3%; and this percentage can be constant or varying in the radial direction in ingot 50.

Depending on the index of refraction desired for the deposited silica and the nature of the fluorine gas, the rate of delivery of the fluorine-containing gas is regulated to send from 0.1 to 1 kilogram per hour of fluorine compound as shown in the following examples.

EXAMPLE III

In this example, evaporator 56 contains only pure $SiCl_4$. The vapors of this compound, entrained by pure, dry oxygen, are injected in the flame by nozzle 52 at a rate of 900 grams of $SiCl_4$ per hour. Sulphur fluoride $SF_6$ stored under pressure in tank 60 is also injected in the flame by nozzle 53 at a delivery of 280 grams per hour.

Under these condition, fluorine-doped silica, exhibiting an index of refraction $n_d = 1.453$, is obtained at a rate of 50 grams per hour. No coloration of the core is observed.

EXAMPLE IV

In this example, pure silicon tetrachloride vapors, entrained by pure, dry oxygen, are injected in the flame by nozzle 52 at a rate of 1000 grams of $SiCl_4$ per hour. Nitrogen trifluoride $NF_3$ is sent through nozzle 53 at a rate of 270 grams per hour.

Under these conditions, fluorine-doped silica, exhibiting an index of refraction $n_d = 1.450$, is obtained at a rate of 55 grams per hour without drawbacks.

It is also possible to deposit an intermediate layer between the titanium-doped silica and the fluorine-doped silica. This layer will exhibit a concentration gradient characterized by a continuous reduction of titanium with increasing radial distance in the ingot. To form such an intermediate layer, the titanium compound or compounds can be injected by nozzle 52 or nozzle 53; and the rate of injection can be varied by progressive closing and opening of valves 66 to 71. The various gas deliveries can be regulated by electrically or pneumatically controlled valves. When the fluorine-doped silica layer is sufficient, valve 71 is closed to terminate the operation by deposit of a fine protective layer of pure silica.

Although fluorine is the most advantageous element, it is possible to lower the index of refraction by doping the silica with boron. Boron can be supplied advantageously by decomposition of boron halide.

If the two types of composites, $SiO_2.TiO_2—SiO_2.F$ and $SiO_2.TiO_2—SiO_2.B_2O_3$, are compared, it is found that the maximum divergence between the indices of refraction can be on the same order of magnitude. On the other hand, the coefficients of expansion are very close in the fluorine-doped composite, while they diverge considerably in the boron-doped composite. To avoid the formation of harmful stresses in the boron-doped composite, it is recommended that an intermediate layer be used, consisting of a mixture of titanium-doped silica and boron-doped silica, between the titanium-doped core and boron-doped sheath.

In accordance with the invention, it is possible to obtain by axial deposition a titanium-doped silica ingot exhibiting a diameter of 30 to 50 millimeters and a length of 400 to 1000 millimeters. Then, with a radial deposition of a silica doped, for example, with fluorine, it is possible to reach a final diameter that can be between 50 and 120 millimeters.

Besides the advantages already mentioned, the ingots obtained by the process of the invention can be heated to their softening temperature without taking particular precautions.

The ingots made according to the invention can then be placed in a vertical drawing furnace and easily be transformed into transparent rods several meters long whose diameter is between 8 and 20 millimeters. After careful cleaning of their surface, these rods can then be drawn by known means into fibers with a diameter of 100 to 600 $\mu$m. These fibers can be protected by a series of plastic coatings by methods known in the art.

By way of example, an optical fiber obtained by drawing an ingot made by the process of the invention under conditions close to those described in Examples I and III exhibits the following structure and characteristics:
- a core 200 micrometers in diameter, consisting of titanium-doped silica (3% TiO$_2$) exhibiting an index of refraction n$_d$=1.470, and
- a sheath 50 micrometers thick, consisting of fluorine-doped silica (2% fluorine) exhibiting an index of refraction n$_d$=1.448.

This fiber is then covered with two layers of coatings performing solely the role of mechanical protection. The first coating, 30 micrometers thick, is made with a "high index" (n$_d$>1.460) vulcanizable silicone resin. The second coating, 120 micrometers thick, is formed by a thermoplastic material.

This fiber exhibits a numerical aperture equal to 0.253 and an attenuation on the order of 5 dB/km at the usual wavelengths in the near infrared.

What is claimed is:

1. A process of making optical fibers from doped silicas comprising the steps of:
    forming a cylindrical ingot by axial deposition, on a heat-stable support, of titanium-doped silica obtained by decomposition and oxidation of at least a silicon compound and a titanium compound in the flame of an induction plasma burner, at least one of said compounds containing a predetermined supply of hydrogen,
    coating said ingot surface by a radial deposition of at least a doped silica so that the index refraction of this silica is less than that of the ingot, and
    drawing the ingot thus coated into the shape of fibers of narrow diameter,
    wherein, during the first step, the silicon and titanium compounds are decomposed and oxidized to form SiO$_2$, TiO$_2$ and H$_2$O and the supply of hydrogen is determined so as to deposit directly on said heat-stable support a vitreous mass having a concentration of hydroxyl groups between 10 and 50 parts per million.

2. The process of claim 1 wherein gaseous silicon and titanium compounds are injected on the outside of the burner and penetrate the plasma flame crosswise.

3. The process of claim 1 wherein the total hydrogen content of the compound or compounds sent in to the flame of said burner is such that concentrations of hydroxyl groups in the doped silica are between 20 and 30 parts per million.

4. The process of claim 1 wherein the silica is formed from the decomposition and oxidation of a mixture of silicon tetrachloride (SiCl$_4$) and trichlorosilane (SiHCl$_3$).

5. The process of claim 1 wherein the titanium is supplied by at least one of the compounds selected from the group consisting of titanium tetrachloride, isobutyl titanate, and isopropyl titanate.

6. The process of claim 5 wherein the amount of titanium injected in the plasma is such that the resulting vitreous silica contains a weight percentage of TiO$_2$ between 0.1 and 8%.

7. The process of claim 1 wherein during the step of coating the ingot surface by radial deposition there is deposited on the titanium-doped silica ingot a fluorine-doped silica whose weight content in fluorine is between 0.1 and 3%.

8. The process of claim 7 wherein between the titanium-doped silica core and the florine-doped silica periphery there is radially deposited an intermediate layer made up of silica simultaneously doped with titanium and fluorine.

9. The process of claim 8 wherein during formation of the intermediate layer the composition of the gaseous mixture is modified by progressively reducing the delivery of the titanium compound or compounds relative to the delivery of the fluorine compound.

10. The process of claim 7 wherein the fluorine is supplied by at least one of the compounds selected from the group consisting of sulfur hexafluoride and nitrogen trifluoride.

11. In the manufacture of optical fibers using doped silicas, a process for making a doped ingot comprising the steps of:
    forming a cylindrical ingot by axial deposition, on a heat-stable support, of titanium-doped silica obtained by decomposition and oxidation of at least a silicon compound and a titanium compound in the flame of an induction plasma burner, at least one of said compounds containing a predetermined supply of hydrogen, and
    coating said ingot surface by a radial deposition of at least a doped silica so that the index of refraction of this silica is less than that of the ingot,
    wherein, during the first step, the silicon and titanium compounds are decomposed and and oxidized to form SiO$_2$, TiO$_2$ and H$_2$O and the supply of hydrogen is determined so as to deposit directly on said heat-stable support a vitreous mass having a concentration of hydroxyl groups between 10 and 50 parts per million.

12. The process of claim 11 wherein gaseous silicon and titanium compounds are injected on the outside of the burner and penetrate the plasma flame crosswise.

13. A doped ingot for use in manufacturing optical fiber formed in accordance with claim 11 and comprising:
    a core of titanium-doped silica that is approximately 30 to 50 millimeters in diameter, said titanium constituting about 0.1 to 8% by weight of the silica; and
    a sheath of fluorine-doped silica surrounding said core, the total diameter of said core and sheath being approximately 50 to 120 millimeters, said fluorine constituting about 0.1 to 3% by weight of the silica of said sheath.

14. The process of claim 11 wherein the silica is formed from the decomposition and oxidation of a mixture of silicon tetrachloride (SiCl$_4$) and trichlorosilane (SiHCl$_3$) and the titanium is supplied by at least one of the compounds selected from the group consisting of titanium tetrachloride, isobutyl titanate, and isopropyl titanate.

15. The process of claim 14 wherein the amount of titanium injected in the plasma is such that the resulting vitreous silica contains a weight percentage of TiO$_2$ between 0.1 and 8%.

16. The process of claim 14 wherein during the step of coating the ingot surface by radial deposition there is deposited on the titanium-doped silica ingot a fluorine-doped silica whose weight content in fluorine is between 0.1 and 3%.

17. The process of claim 16 wherein between the titanium-doped silica core and the fluorine-doped silica periphery there is radially deposited an intermediate layer made up of silica simultaneously doped with titanium and fluorine.

18. The process of claim 17 wherein during formation of the intermediate layer the composition of the gaseous mixture is modified by progressively reducing the delivery of the titanium compound or compounds relative to the delivery of the fluorine compound.

19. The process of claim 16 wherein the fluorine is supplied by at least one of the compounds selected from the group consisting of sulfur hexafluoride and nitrogen trifluoride.

* * * * *